(12) United States Patent
Shenfield et al.

(10) Patent No.: US 8,122,130 B2
(45) Date of Patent: *Feb. 21, 2012

(54) ACCESS CONTROL SYSTEM AND METHOD FOR WIRELESS APPLICATION PROVISIONING

(75) Inventors: Michael Shenfield, Richmond Hill (CA); Laura Brindusa Fritsch, Los Altos, CA (US); Viera Bibr, Kilbride (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/958,128

(22) Filed: Dec. 1, 2010

(65) Prior Publication Data

US 2011/0072044 A1    Mar. 24, 2011

Related U.S. Application Data

(63) Continuation of application No. 11/538,083, filed on Oct. 3, 2006, now Pat. No. 7,870,255.

(51) Int. Cl.
*G06F 15/16* (2006.01)
(52) U.S. Cl. ......... 709/225; 709/217; 709/223; 713/166
(58) Field of Classification Search .......... 709/200–203, 709/217–227; 713/166
See application file for complete search history.

(56) References Cited

U.S. PATENT DOCUMENTS

| | | | |
|---|---|---|---|
| 5,941,947 A | 8/1999 | Brown | |
| 6,934,848 B1 | 8/2005 | King | |
| 6,996,537 B2 | 2/2006 | Minear | |
| 7,024,689 B2 | 4/2006 | O'Donnell | |
| 7,035,630 B2 | 4/2006 | Knowles | |
| 7,120,677 B1 | 10/2006 | Berger | |
| 7,239,877 B2 | 7/2007 | Corneille | |
| 7,353,512 B2 | 4/2008 | Katz | |
| 7,596,562 B2 | 9/2009 | Lee | |
| 7,870,255 B2 * | 1/2011 | Shenfield et al. | 709/225 |
| 2002/0002413 A1 | 1/2002 | Tokue | |
| 2002/0131404 A1 * | 9/2002 | Mehta et al. | 370/352 |
| 2002/0144151 A1 | 10/2002 | Shell | |
| 2003/0022657 A1 * | 1/2003 | Herschberg et al. | 455/414 |
| 2003/0065777 A1 | 4/2003 | Mattila | |
| 2004/0019799 A1 * | 1/2004 | Vering et al. | 713/200 |
| 2004/0054923 A1 | 3/2004 | Seago | |
| 2004/0110497 A1 | 6/2004 | Little | |
| 2004/0163088 A1 | 8/2004 | Frender | |
| 2005/0015505 A1 | 1/2005 | Kruis | |
| 2005/0071448 A1 | 3/2005 | Katz | |
| 2005/0075115 A1 | 4/2005 | Corneille | |

(Continued)

OTHER PUBLICATIONS

Non-Final Office Action; U.S. Appl. No. 11/538,083; Nov. 12, 2009.

(Continued)

*Primary Examiner* — Moustafa M Meky
(74) *Attorney, Agent, or Firm* — Novak Druce + Quigg LLP

(57) ABSTRACT

A method for controlling access to content on a network, the method comprising the steps of associating access credentials with content to be published for download receiving a content download request from a mobile device, the content download request including access information, matching the received access information with the published content access credentials to permit access to the published content and allowing the permitted content to be downloaded by the mobile device.

19 Claims, 4 Drawing Sheets

U.S. PATENT DOCUMENTS

| | | |
|---|---|---|
| 2005/0172281 A1 | 8/2005 | Goring |
| 2005/0198348 A1 | 9/2005 | Yeates |
| 2005/0213763 A1 | 9/2005 | Owen |
| 2005/0216377 A1 | 9/2005 | Trauberg |
| 2005/0232428 A1 | 10/2005 | Little |
| 2005/0277403 A1 | 12/2005 | Schmidt |
| 2006/0094354 A1 | 5/2006 | Munje |
| 2006/0282516 A1 | 12/2006 | Taylor |
| 2007/0077914 A1 | 4/2007 | Plestid |
| 2007/0204039 A1 | 8/2007 | Inamdar |
| 2008/0301231 A1 | 12/2008 | Mehta |

OTHER PUBLICATIONS

Non-Final Office Action; U.S. Appl. No. 11/538,083; Mar. 16, 2009.

Office Action dated Apr. 1, 2011; Canadian Patent App. No. 2,606,036.

* cited by examiner

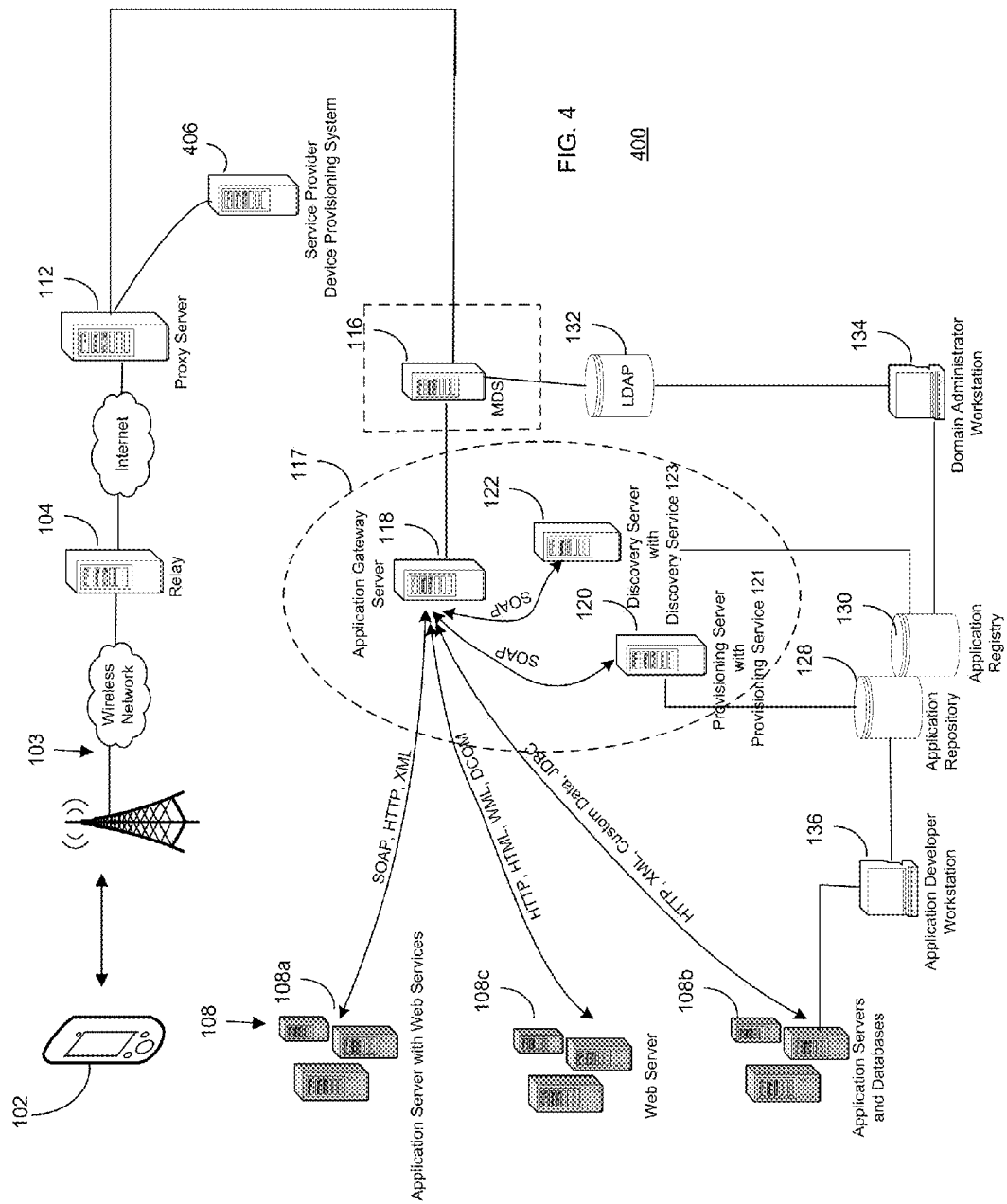

ACCESS CONTROL SYSTEM AND METHOD FOR WIRELESS APPLICATION PROVISIONING

CROSS-REFERENCE TO RELATED APPLICATIONS

This application is a continuation application of application Ser. No. 11/538,083, filed on Oct. 3, 2006, the entire disclosure of which is hereby incorporated by reference for all purposes.

The present matter relates generally to communication systems for a plurality of mobile devices and specifically to an access control system and method for wireless application provisioning of such devices.

BACKGROUND

An increasing number of mobile communication devices, which include PDAs (personal digital assistants), cell phones, two-way pagers and such like, now permit users to not only access services such as electronic mail (e-mail,) but to download applications which can be run on these devices. Before a device can be used, it must be provisioned with a service profile. In the past, provisioning systems required that a dealer provision the device for the user. If the user decided to purchase a different terminal or upgrade services, the user was forced to return to the dealer to provision, or re-provision the terminal. More recent provisioning systems have made it possible to allow the user to initiate provisioning from the device.

Provisioning of services typically follows the following steps. Following manufacture of the device, an address of a registration server is stored in the device by the provider of the service or by an operator of a wireless network that the device is compatible with.

When the user first obtains the device, the user enables the communication system of the device, which in turn detects the presence of the wireless network and uses the stored registration server address to send a registration request to the registration server. The registration server, in conjunction with a provisioning server, determines whether the device may be provisioned with the associated service. If the registration request is approved, the device is provided with a service book that contains data and instructions that enable services on the device.

Once the device is enabled, the user may download and install content, including software applications, on the device, over the wireless network. Many organizations purchase or create Web-based applications for use by staff and external users. Various mechanisms for controlling access to such services are in use.

From the user's perspective, installing an application on the device is simply a matter of finding an interesting application on the Web and initiating its download over the wireless network. In a typical over-the-air (OTA) mechanism as described above, the device must have software, termed a discovery application (DA), that allows the user to locate applications at a particular provisioning portal or download server (DS) on the network and to choose which applications to download. The DA may be browser-based or a native application, as long as it shares a common provisioning protocol with the download server; for example, HTTP. The DS is a host, visible in the network that typically runs a Web server and has access to a content repository. It has two main functions: it provides properly formatted menus, often written in WML or HTML, that lists the applications currently available for download, and it provides controlled access to the applications.

The content repository, as the name implies, is the repository of all the application descriptors and applications that are available for download. An OTA provisioning system typically encompasses content management and publication, access control, installation (and upgrading of versions) of applications. Content management server software manages the repository, typically a database, and supports content versioning, and ways for developers to drop their applications into the repository.

If the download server supports access control, the provisioning server must properly authenticate users and apply access-control policies before applications are downloaded The above describes in general an OTA provisioning infrastructure, typical in the public environment, where user credentials are tied to access control since tracking the use of applications (content), for example for billing purposes, is important.

However in some environments, this type of access control mechanism may not be practical. For example, a similar application provisioning infrastructure has been applied in corporate or retail environments Within a corporate domain in which users may be assigned roles or belong to different groups, (such as account managers, sales staff etc.). A combination of roles defines what a user can do within the corporate domain. In other words, a user's role within the corporate domain determines which applications they have access to. Typically, a domain administrator assigns these roles or rights to a user and accordingly is also tasked with managing access to applications and services in the domain. Once a device is initially provisioned, credentials are exchanged between the device and server to authenticate the user, who is then authorized, based on their rights and roles, to access various applications, some of which may be outside the corporate domain. This is called role-based authorization, which determines the applications and services he/she is entitled to.

Furthermore as new applications are made available in the corporate domain, a user's credentials must be accessed to update his or her corresponding roles with the appropriate new applications to which they are entitled. With a domain having a large number of users, typically hundreds or even thousands, this can become quite cumbersome for the domain administrator, as it does not provide a centralized point of access control by the domain administrator. This in turn limits the scalability of the infrastructure.

A similar problem exists in public network infrastructures, where rather than users having roles, there is a contractual agreement with one or more service providers that define the applications and services that he or she is entitled to.

Accordingly, there is a need for a manner of controlling access to downloadable network resources, while providing expandability, automation, and ease of administration.

BRIEF DESCRIPTION OF THE DRAWINGS

Embodiments of the present matter will be described, by way of example only, with reference to the attached figures, wherein:

FIG. 4 is a block diagram of a public wireless communication infrastructure in which an access control system and method, according to a further embodiment of the present matter, may be employed.

DETAILED DESCRIPTION OF PREFERRED EMBODIMENTS

Figure 1:
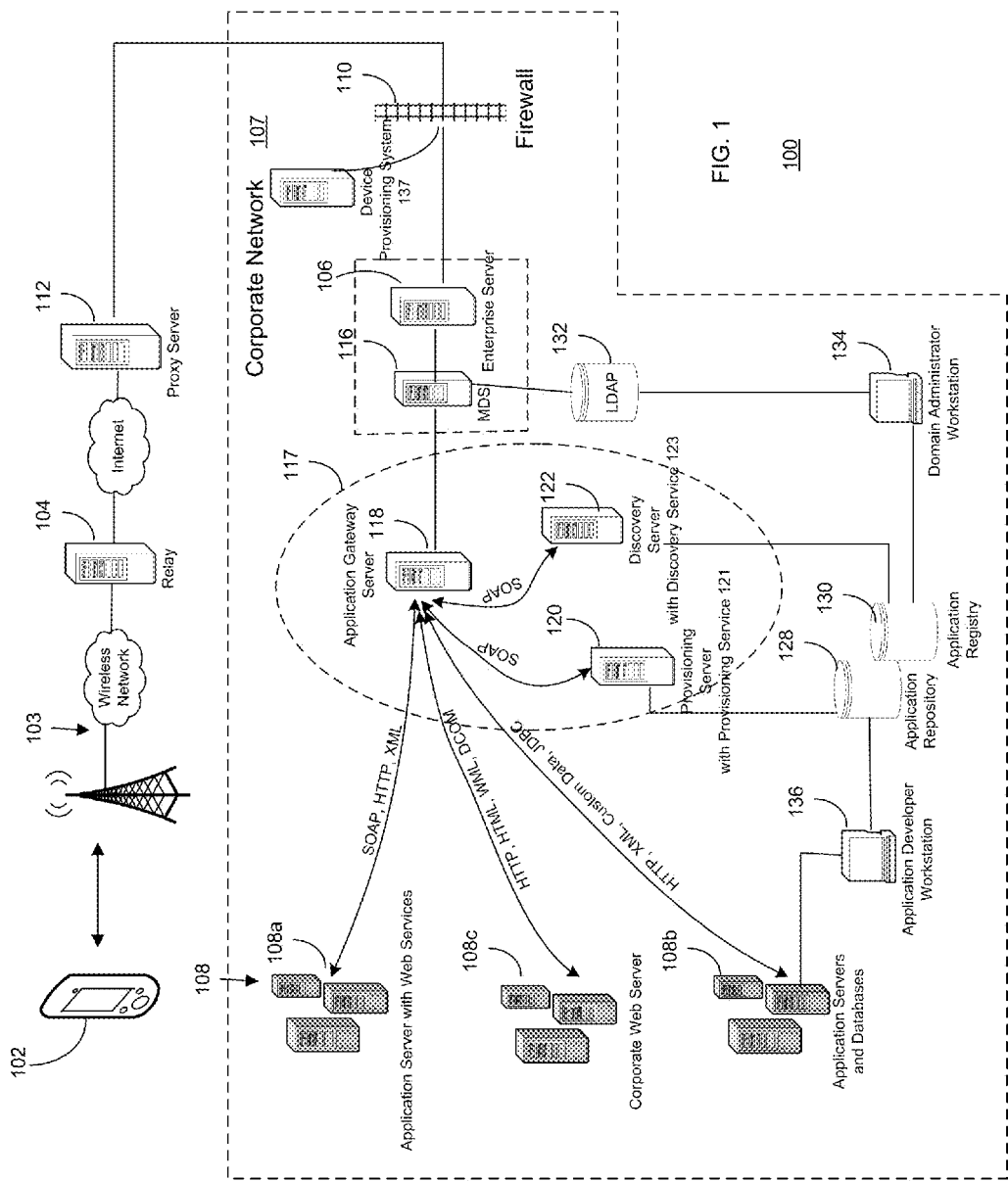
FIG. 1 is a block diagram of a corporate wireless communication infrastructure in which an access control system and method, according to an embodiment of the present matter, may be employed.

For convenience, like numerals in the description refer to like structures in the drawings.

An advantage of the present matter is that it provides a method for simplifying control of access to applications available to mobile users for download in a domain. A further advantage of the present matter is that it provides a centralized location for controlling access to content by domain administrators.

A further advantage of the present matter is that it provides a fully transparent and scalable infrastructure that does not require access to the domain's database of user credentials every time a user requests download of an application.

In accordance with an embodiment of the present matter there is provided a method for controlling access to content on a network, the method comprising the steps of: associating access credentials with content to be published for download; receiving a content download request from a mobile device, the content download request including access information; matching the received access information with the published content access credentials to permit access to the published content; and allowing the permitted content to be downloaded by the mobile device.

In accordance with a further embodiment of the present matter there is provided a system for controlling access by a mobile device to content on a network, comprising: a content registry for publishing content for download from the network, the content having access credentials associated therewith; a provisioning system for pushing access information to the users device; and a discovery service for receiving a content download request from the mobile device, the content download request including the access information; and matching the received access information with the published content access credentials to permit access to the published content.

In a further embodiment, the access information includes data identifying one or more roles assigned to the user of the device within a corporate network.

In a still further embodiment the access information includes access data identifying access rights to one or more service providers within a public network.

In a still further embodiment, there is provided a provisioning service which is configured to allow the permitted content to be downloaded by the mobile device.

Referring to FIG. 1, there is shown an exemplary corporate wireless communication infrastructure 100 in which an embodiment of the present method is generally operable. The communication infrastructure 100 comprises a plurality of wireless mobile devices 102 (one shown) for communicating via a wireless network 103, typically a packet data service network, through a relay host 104 to an enterprise server 106 within a corporate network 107. The enterprise server 106 is generally placed behind a firewall 110 and makes a connection via the Internet to the relay host 104, which communicates with the wireless network 103. A proxy server 112 may be used in a demilitarized zone (outside the firewall) so that the enterprise server 106 connects to the proxy server 112 only, which then communicates with the wireless network 103 over the Internet.

The enterprise server 106 may incorporate a mobile data server (MDS) 116 for extending the functionality of the enterprise server 106 to provide a mobile workforce with access to a wide range of corporate data and applications, typically via an application gateway 117.

The application gateway 117 comprises a gateway server 118 a provisioning server 120 and a discovery server 122. The gateway server 118 acts as a message broker between a runtime environment on the wireless devices 102 and backend servers 108. The gateway server 118 is in communication with both the provisioning server 120 and the discovery server 122. The gateway server 118 is further in communication with a plurality of the backend servers 108, such as Web services 108a, database services 108b, as well as other enterprise services 108c, via a suitable link. For example, the gateway server 118 is connected with the Web services 108a and database services 108b via Simple Object Access Protocol (SOAP) and Java Database Connectivity (JDBC) respectively. Other types of backend servers 108 and their corresponding links will be apparent to a person of ordinary skill in the art.

A provisioning service 121 and a discovery service 123 are provided by the provisioning server 120 and discovery server 122, respectively.

The system 100 also includes a content repository 128 which is the repository of all the applications that are available for download and a content registry 130, which is a repository of the associated application descriptors to be published. Content management software associated with the discovery service 123 manages the repository, typically a database, and supports content versioning. Access to the repository is typically password protected. More specifically, the discovery server 122 wraps the application registry 130 with the discovery Web service 123 and allows users to search the registry 130 for applications (or application upgrades) that are available for download. Users can select these applications and deploy them to their devices 102 as will be described below. Generally, an application developer will access the application repository 128 from his or her workstation 136 to deploy new wireless applications therein. Wireless applications can be developed and deployed both internally and externally to the corporate network 107.

A domain administrator can access the application repository via the administrator workstation 134 and assign roles or access credentials to the application (based on policies). These credentials are included with the application descriptor which is stored and published in the registry 130. The registry can be part of the mobile data services on the enterprise server 106. In the corporate environment 107, users (i.e. devices) are assigned roles within the domain. The domain administrator also associates with each new application a list of roles, such that at a later stage only those applications with roles corresponding to users with the same roles will be available for download to those users.

The mobile devices 102 are typically personal digital assistants (PDAs), such as a Blackberry™ by Research in Motion for example, but may include other devices. Each of the mobile devices 102 includes a runtime environment capable of hosting a plurality of applications, a software module or agent 104, termed a discovery application (DA), that allows the user to locate applications at a particular provisioning portal or download server on the network and to choose which applications to download. The DA may be browser-based or a native application, as long as it shares a common provisioning protocol with the download server; for example, HTTP. In addition the mobile devices 102 include secure storage for storing data, which is not visible or editable by the user. Typically this data is stored in an encrypted form.

Each mobile device 102 is initially provisioned by a device provisioning system 137 with a service book (not shown) establishing various protocols and settings, including connectivity information for the enterprise server 106 and/or the mobile data server 116. These parameters may include a Uniform Resource Locator (URL) for the application gateway server 118 as well as its encryption key. Alternatively, if the mobile device 102 is not initially provisioned with the URL and encryption key, they may be pushed to the wireless device 102 via the mobile data server 116. The mobile device 102 can then connect with the application gateway 106 via the URL of the application gateway server 118. The application gateway server 118 serves as a message broker between the runtime environment and the discovery service. Typically, the runtime environment communicates with the discovery service 123 through a search interface (not shown).

Figure 2:
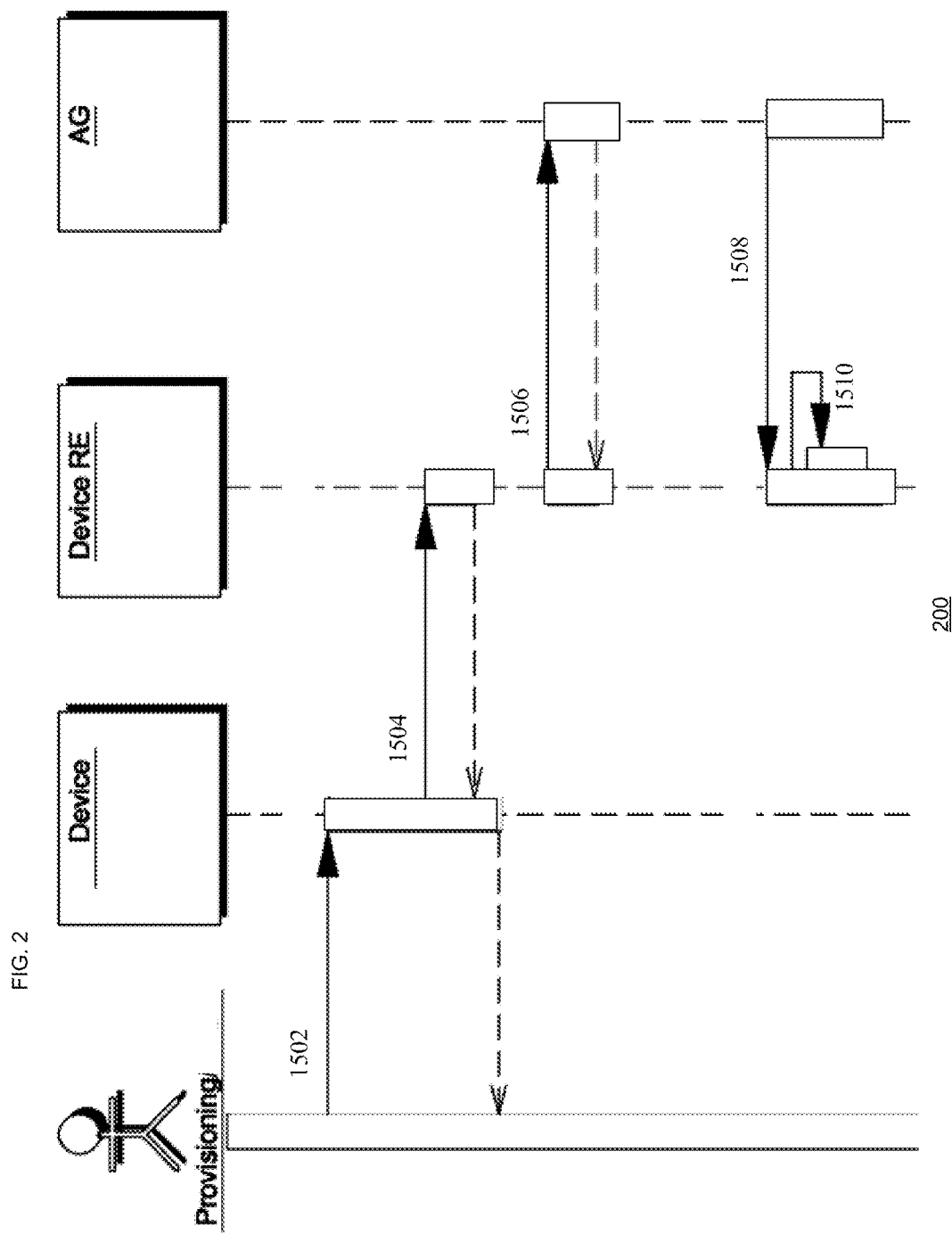
FIG. 2 is a sequence diagram illustrating initialization of a mobile device.

Referring to FIG. 2, an example of runtime initialization is illustrated generally by numeral 200. In step 1502, the service book is loaded to the wireless device. As previously described, the service book may be pushed to the wireless device by the device provisioning system 137 or it may be loaded by an administrator using a local, wired connector. In step 1504, the wireless device 102 notifies the runtime environment that it has received the service book. The runtime environment acknowledges the notification to the wireless device 102, which in turn acknowledges the response to the service that initially pushed the service book.

In step 1506, the runtime environment sends a registration message to the URL specified in the service book to register itself with the application gateway 117. The registration message includes wireless device identification information and system information, such as the runtime environment version, and the like. The application gateway 117 registers the device by recording pertinent information in a lifecycle subsystem and an administration service, and acknowledges the registration message.

In step 1508, the application gateway 117 transmits a user administration profile and default component application administration profile to the runtime environment, and in step 1510 the profiles are stored by the runtime environment. The user administration profile defines end user privileges as well as user roles and domain-related settings for the wireless device 102. Once the wireless device 102 is registered with the application gateway 117, it can begin to request provisioning of applications.

In summary, the device provisioning subsystem (public/retail space) 137 or corporate mobile server (enterprise) assigns role(s) to the device user and sends/pushes this information OTA to the device as a part of "service books". The "service books" should be pushed again when any of the user roles changes.

Figure 3:
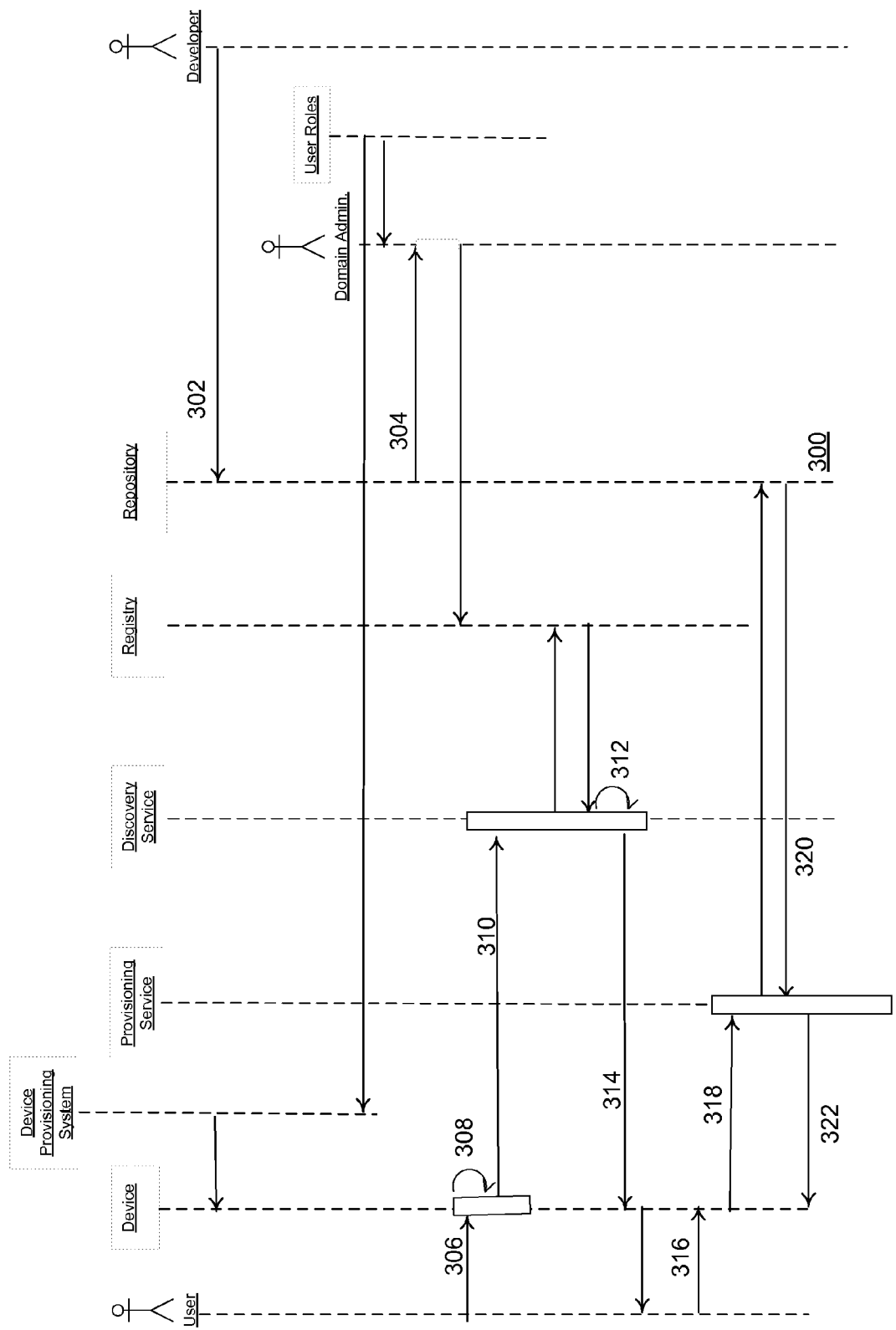
FIG. 3 is a sequence diagram illustrating provisioning of an application according to an embodiment of the present matter.

Referring to FIG. 3, a system workflow is illustrated generally by numeral 300. In step 302 a developer saves a new wireless application or a new version of an existing application in the repository 128. The application is published in the application registry 130 either in the corporate domain 107 or public domain described below later. In step 304 the domain administrator 134 or service provider administrator accesses the registry 130 to assign access credentials to the application published in the registry 130.

In step 306 the user issues a search request including search criteria to the device 102. It is assumed that the device 102 has been previously provisioned by the device provisioning system 137 with a service book defining the appropriate roles or access rights. The discovery application on the wireless device 102 retrieves the roles or access rights, in step 308, previously stored in the device 102 and accesses the application registry 130 either directly or via the mobile proxy 112 and sends, in step 310, the search criteria including the list of roles or access rights assigned to device user at provisioning. The roles or access rights are typically not visible to and editable by the device user and retrieved directly from the secured (encrypted or signed) storage on the device. In step 312 the discovery Web service that wraps the application registry 130 matches' user roles to application access credentials and returns, in step 314, only the applications that are allowed to be accessed or provisioned to the roles assigned to the device user.

Once the wireless device 102 has received the descriptor for the application to be provisioned, the wireless device 102 can proceed to retrieve the application. Accordingly, in step 316 the device user selects one of the applications (or multiple applications if multi-install mode is supported by the device). In step 318 the device sends the selected application to the provisioning service, which loads, in step 320, the application from the application repository 128 and sends it OTA, in step 322, to the user device where the application is installed.

Referring now to FIG. 4, there is shown an exemplary public wireless communication infrastructure 400 in which an embodiment of the present method is generally operable. As may be seen, the public infrastructure 400 is similar to the corporate infrastructure 100. However, instead of the user of the devices 102 being assigned roles, which is a common scenario in the enterprise or corporate domain, the user of the device 102 is assigned access rights for specific service providers by the domain administrator. These access rights may, for example, be determined by a particular level of services for which the user has subscribed. As in the corporate domain, a service book is pushed to the device by the provisioning system 406 (the service book may be transparent or un-editable by the user) and includes a service profile that defines what the user is contractually allowed to access from one or more specific service providers. As in the corporate domain, applications are stored in a common repository 128 and published in the registry 130 as described earlier, but the domain administrator assigns the applications access rights (credentials) associated with specific service providers so that only users that have one of those service providers and the corresponding access rights in their service profile can view and install the service providers' applications. The functions performed by the provisioning service 121 and discovery service 123 are similar to that described with respect to the corporate network 100.

In summary, it may be seen that the present matter provides a centralized point of access control by the domain administrator in either the corporate domain or public domain. In the corporate domain, the user is assigned roles, and in the public domain, the user is assigned access rights by a specific service provider. Once the mechanism for assigning roles/access rights to the applications and pushing data defining these roles/access rights to the devices is implemented (i.e. once the device provisioning system sets up the device), the device provisioning system does not have to know how those roles or access rights are used in the future. The remaining infrastructure is fully transparent and scalable as it does not require access to user credentials each time a request for content is made by the user. The system relies on the discovery service to filter out all the applications that the user is not supposed to be able to install. Furthermore the provisioning service need simply accept the list of selected applications received from the device without having to verify the user's credentials (i.e. the provisioning service enables application installation but does not have a role in controlling what the device can install). Typically, the user roles and credentials need only be accessed by the administrator when a new or updated application is saved into the repository or when an application is removed or when user roles within a corporate network or rights associated with a specific service provider change, thus reducing administrative burden. It may be noted that the present matter is described in the context of wireless applications; however it may be appreciated that the present matter may be equally well applied to any downloadable content.

While certain features of the matter have been illustrated as described herein, many modifications, substitutions, changes and equivalents will now occur to those skilled in the art. It is, therefore, to be understood that the appended claims are intended to cover all such embodiments and changes as fall within the true spirit of the matter.

What is claimed is:

1. A mobile device for accessing published content on a network, the mobile device comprising:
    a memory for storing access information including role data identifying one or more user roles assigned to the mobile device, the access information being pushed to the mobile device;
    a discovery agent for:
        sending a user search request and the access information to a content registry on the network; and
        receiving a search result from the content registry, the search result including a list of published content having an access credential matching the access information, the access credential being associated with the published content; and
    a retrieving module for sending a user selection based on the search result and for downloading the published content associated with the user selection.

2. The mobile device according to claim 1, further comprising:
    a runtime environment hosting the discovery agent and the retrieving module.

3. The mobile device according to claim 1, wherein the network comprises:
    a discovery service for receiving the user search request from the discovery agent, searching the content registry and sending the search result to the discovery agent; and
    a retrieving service for receiving the user selection from the retrieving module and for sending the user selection to the retrieving module.

4. The mobile device according to claim 1, wherein the access information is part of a service book.

5. The mobile device according to claim 1, wherein the access information is pushed to the mobile device during initialization of the mobile device.

6. The mobile device according to claim 1, wherein the access information stored in the memory is updated by the network when the access information is updated, the updated access information being pushed to the mobile device.

7. The mobile device according to claim 1, wherein the access information stored in the memory is uneditable by a user or invisible to the user.

8. The mobile device according to claim 1, wherein the access information is encrypted.

9. The mobile device according to claim 1, wherein the published content is stored in a content repository.

10. The mobile device according to claim 9, wherein the content repository and the content registry are stored in a repository.

11. The mobile device according to claim 1, wherein the content registry comprises:
    descriptors for the published content; and
    the access credential.

12. A method for accessing published content on a network including a mobile device, the method comprising:
    receiving a search request of the published content from a user interface of the mobile device;
    retrieving, from a memory of the mobile device, access information including role data identifying one or more user roles assigned to the mobile device, the access information being pushed to the mobile device;
    sending the access information and the search request to the network;
    receiving a search result including a list of published content having an access credential matching the access information, the access credential being associated with the published content; and
    allowing the mobile device to download the published content from the search result.

13. The method according to claim 12, wherein the search request is sent to a discovery service on the network and the discovery service determines access to the published content by matching the access credential with the access information.

14. The method according to claim 12, wherein allowing further comprises:
    accepting a user selection from the search result;
    sending the user selection to a retrieving service; and
    downloading the published content associated with the user selection from the retrieving service.

15. The method according to claim 12, wherein the access information is part of a service book.

16. The method according to claim 12, wherein the access information is pushed to the mobile device during initialization of the mobile device.

17. The method according to claim 12, further comprising:
    updating the access information stored in the memory by pushing the updated access information to the mobile device.

18. The method according to claim 12, wherein the access information stored in the memory is uneditable by a user or invisible to the user.

19. The method according to claim 12, wherein the access information is encrypted.

* * * * *